(No Model.) 3 Sheets—Sheet 3.

O. HUGHES.
DITCHING MACHINE.

No. 467,810. Patented Jan. 26, 1892.

WITNESSES:
J. E. Criswell
C. Sedgwick

INVENTOR:
O. Hughes
BY
Munn
ATTORNEYS

UNITED STATES PATENT OFFICE.

OTTIS HUGHES, OF LOCK SPRING, INDIANA, ASSIGNOR TO HIMSELF AND JEREMIAH S. HULL, OF SAME PLACE.

DITCHING-MACHINE.

SPECIFICATION forming part of Letters Patent No. 467,810, dated January 26, 1892.

Application filed April 14, 1891. Serial No. 388,884. (No model.)

*To all whom it may concern:*

Be it known that I, OTTIS HUGHES, of Lock Spring, in the county of Ripley and State of Indiana, have invented a new and Improved Ditching-Machine, of which the following is a full, clear, and exact description.

My invention relates to ditching-machines; and the object is to produce an improved machine which will automatically dig a ditch and lay tile therein and which will do its work rapidly and well.

To this end my invention consists in a ditching-machine constructed substantially as hereinafter described and claimed.

Reference is to be had to the accompanying drawings, forming a part of this specification, in which similar figures of reference indicate corresponding parts in all the views.

Figure 1:
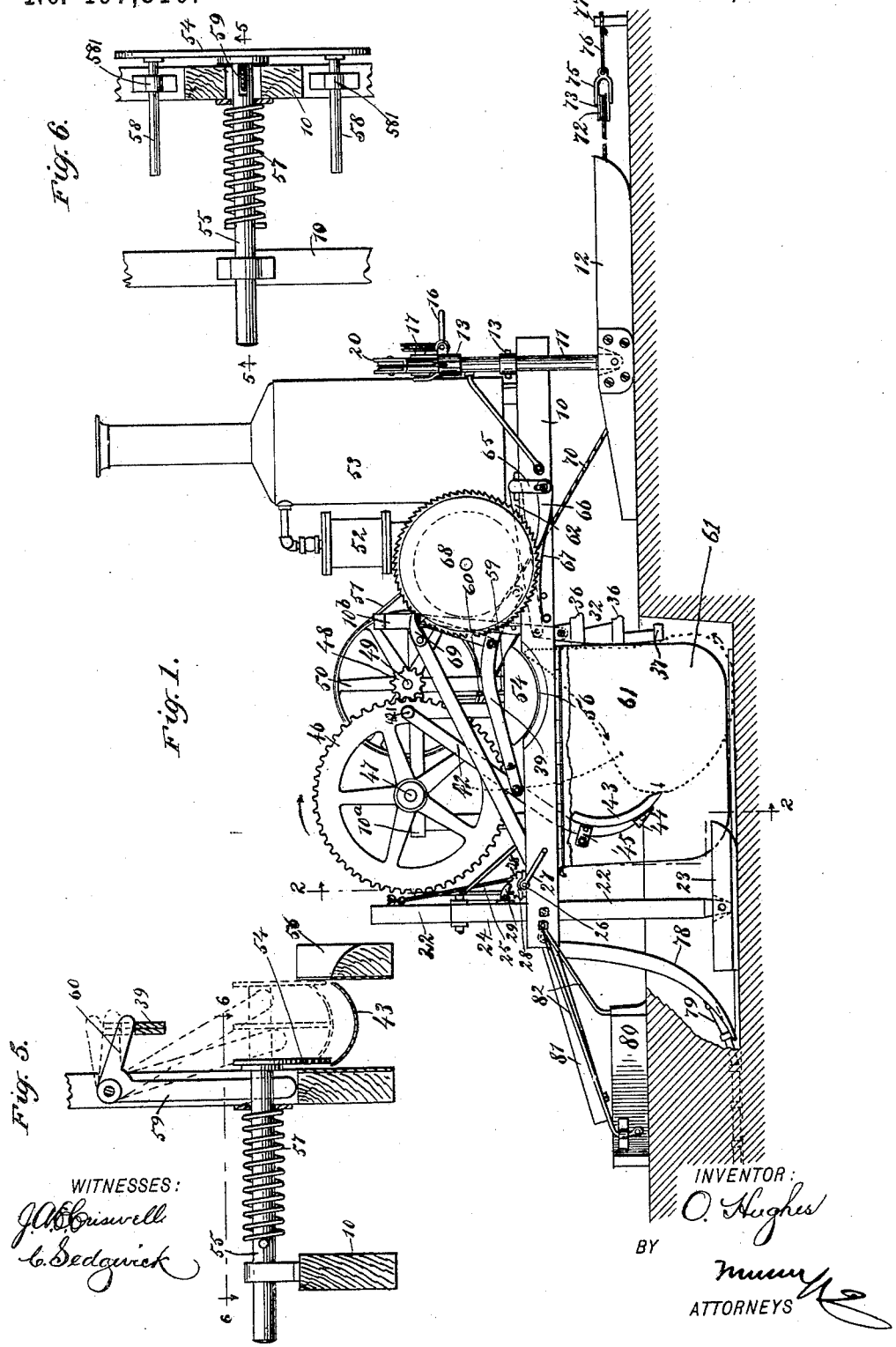
Figure 2:
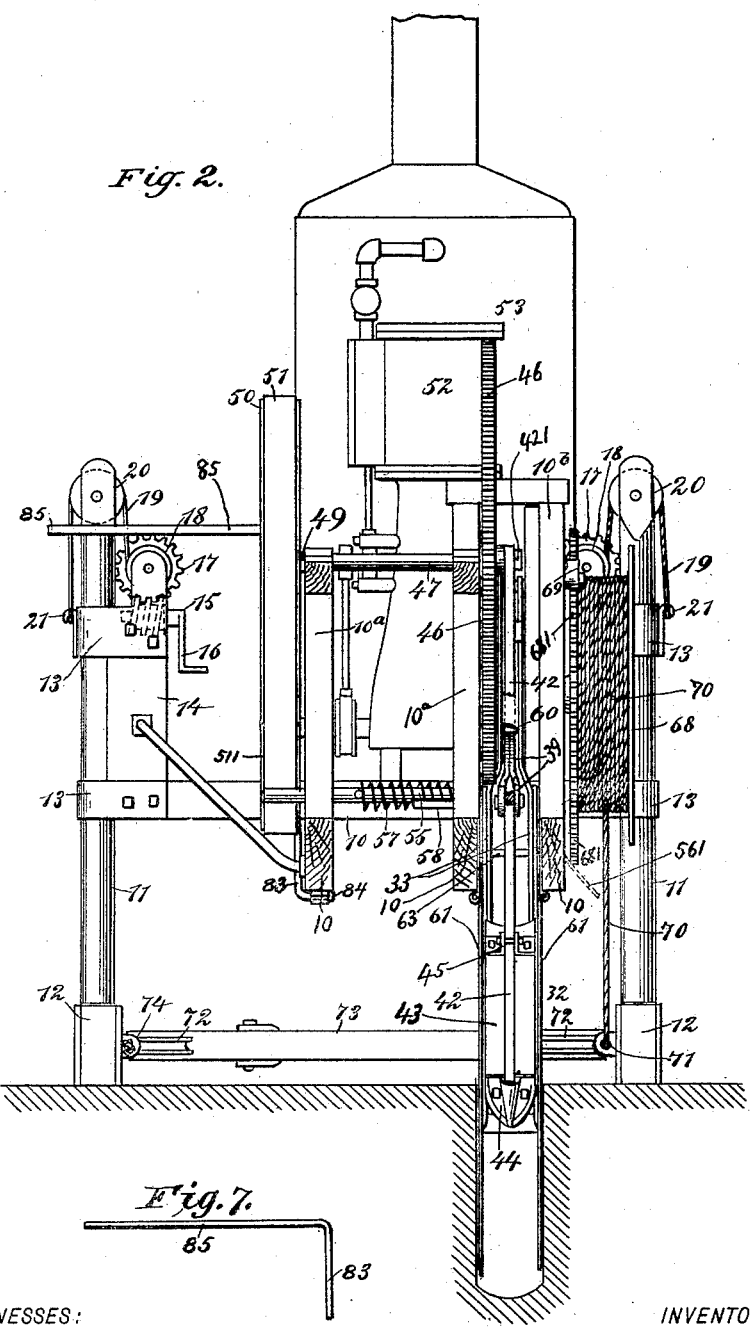
Figure 3:
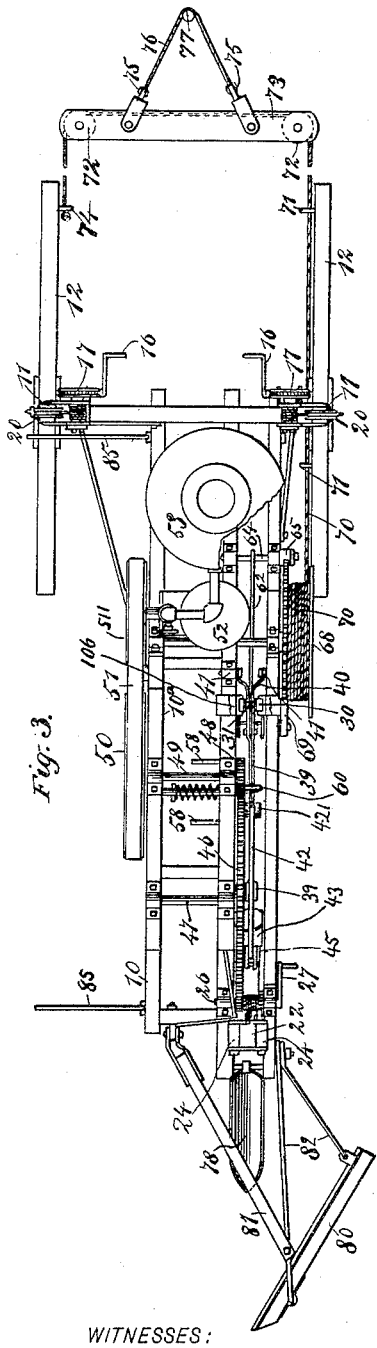
Figure 4:
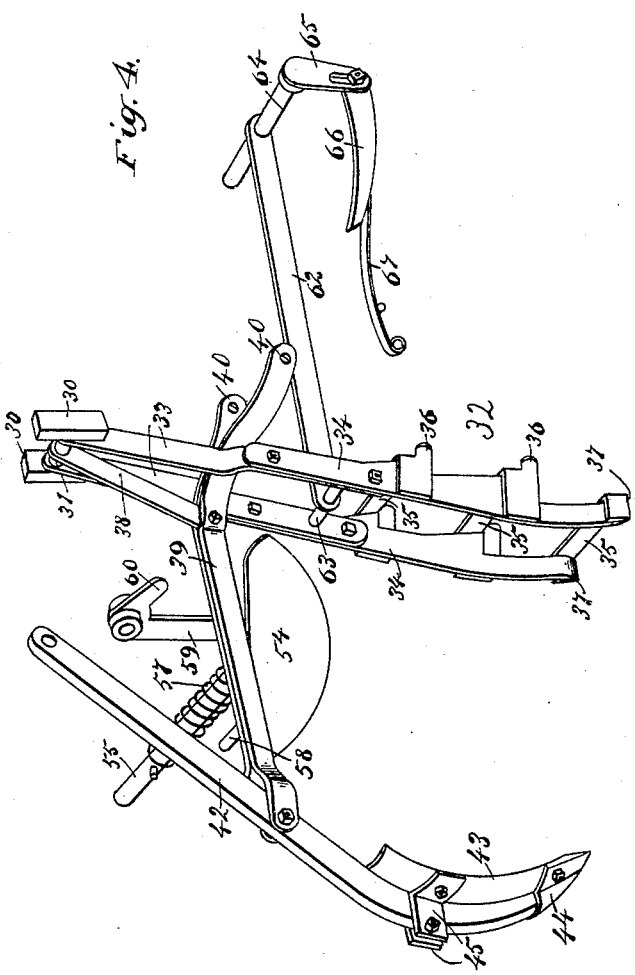

Figure 1 is a side elevation of the machine in position to dig a ditch. Fig. 2 is a vertical cross-section on the line 2 2 in Fig. 1. Fig. 3 is a plan view of the machine. Fig. 4 is an enlarged detail perspective view of the digging-bit, the excavating-shovel, and the scraper or clearer for the shovel. Fig. 5 is a vertical section on the line 5 5 in Fig. 6, showing in detail the means for operating the shovel-scraper. Fig. 6 is a sectional plan of the shovel-scraper and connections on the line 6 6 of Fig. 5; and Fig. 7 is a broken detail view of one of the sight-arms, showing the manner in which it is secured to the machine-frame.

The machine is provided with a main horizontal frame 10, which at its front end is supported on posts 11, the posts extending downward and being hinged at the bottom to shoes or runners 12, which slide upon the ground, and the posts are held loosely in keepers 13, which project from upright portions 14 on opposite sides of the main frame. In the upper ends of these uprights 14 are worm-shafts 15, which are turned by means of crank-handles 16, and which mesh with gear-wheels 17, mounted on the top of the uprights and carrying drums 18. Each drum 18 carries a cable 19, which extends over a pulley 20 in the top of the posts, and the lower end of each cable is secured to a hook 21 on one of the keepers 13. It will thus be seen that by turning the cranks 16 and the worm-gear the frame may be raised or lowered upon the posts, so as to bring it a desired distance from the ground.

The rear end of the main frame 10 is mounted on a single post 22, which is hinged to a shoe 23 at its lower end, and which is movably held between keeper-posts 24 on the rear end of the main frame. This post 22 is adapted to extend downward into the ditch, as shown in Fig. 1, and to the upper end of the post is secured a cable 25, which extends downward and is wound around a shaft 26, which is turned by a crank 27, and which is prevented from turning back by means of a ratchet-wheel 28 and pawl 29. It will be seen that by turning the crank 27 and winding the cable upon the shaft the frame will be raised upon the post 22, and that by raising the pawl 29 the frame may be lowered.

On the center of the main frame 10 is an upright portion $10^a$, which supports the driving mechanism hereinafter described, and which carries, also, a vertical slideway $10^b$. In this slideway $10^b$ are slide-blocks 30, which move vertically and which are connected by a shaft 31, which is pivoted in them. The shaft 31 supports the bit 32, which is used to loosen the earth, and the bit comprises two side members 33, which are suspended from opposite ends of the shaft 31; the side pieces 34, which are bolted to the members 33 and which extend downward therefrom; the cross-knives 35, which are arranged at intervals on the front of the bit and which are held in such position that they do not vertically align; the projecting cutters 36, which extend a little in advance of the cross-knives 35, and the cutters 37, which are arranged at the extreme lower ends of the side pieces 34. The shaft 31 is also provided with a link 38, which extends downward therefrom and which is pivoted to the shovel-beam 39, which beam extends lengthwise of the machine in an approximately horizontal position and which has diverging sides 40 at its front end, each of these side members 40 being pivoted to the main frame, as best shown at 41 in Fig. 3.

The rear end of the shovel-beam 39 is pivoted to the shovel-handle 42, which handle carries a concave-pointed shovel 43 at its lower end, the handle being bent forwardly at its lower end, so as to conform to the shape of the shovel. The handle and shovel are secured together by means of a clip or socket 44 on the lower end and back side of the shovel, which socket receives the lower end of the handle, and by clips 45, which are bolted to the back of the shovel and clamped to the handle. The upper end of the handle 42 is pivoted to a crank 421 on a large gear-wheel 46, which is carried by a shaft 47, mounted on the upright portion $10^a$ of the frame. The gear-wheel 46 meshes with a pinion 48 on a shaft 49, which is also supported in the upright portion of the frame and which is provided with a driving-pulley 50, connecting by a belt 51 with the fly-wheel 511 of the engine 52, the engine being driven by the boiler 53, and both engine and boiler being mounted on the front portion of the main frame 10. It will be seen, then, that when the engine is driven the gear-wheel 46 will be revolved and the movement of the gear-wheel will give a circular movement to the upper end of the shovel-handle 42. Since the central portion of the shovel-handle 42 is pivoted to the free end of the shovel-beam 39, the lower end of the handle and the shovel-blade will be caused to follow a reversed curvilinear path, which, by reason of the peculiar proportions of the parts, causes the shovel-blade to properly elevate the earth from the bottom of the trench and carry it opposite the ejector or shovel-scraper 54, hereinafter described. At the same time the vertical swinging movement of the shovel-beam 39 will cause the slide-blocks 30, by means of the connecting-link 38, to move up and down in the slideway $10^b$, so that the bit 32 will be moved up and down in unison with the movement of the shovel, and as the bit is located directly in front of the shovel it will loosen the earth so that it may be readily shoveled up. When the shovel reaches its highest point, the earth which it contains is pushed out of it on one side by means of a scraper 54, which scraper is shaped on its under side to conform with the shape of the shovel, and which is carried by a transverse shaft 55, the scraper being held to move in a recess 56 in the main frame, so that when it pushes the earth from the shovel the earth will pass out through the side of the frame and to one side of the ditch. If necessary, a chute 561 may be provided to guide the earth, as shown by dotted lines in Fig. 2.

The ejector or shovel-scraper 54 and the shaft 55 are normally pushed backward away from the shovel by means of a spring 57, and the back of the scraper is provided with guide-rods 58, which move in suitable keepers 581 on the main frame, and which prevent the displacement of the scraper. The shovel-scraper is moved forward by an elbow-lever 59 60, which is pivoted in the main frame above, the long arm 59 of the lever extending downward through a slot in the scraper-shaft, as best shown in Fig. 6, and the short arm 60 of the lever extends forwardly into the path of the shovel-beam 39. The length of the long arm 59 of the lever is such that when the shovel-beam 39 is raised it will not strike the short arm 60 until the shovel nearly reaches the highest point of its stroke.

Hinged to the main frame at each side of the shovel-beam 39, are shields 61, which hang downward and are long enough to extend well down into the ditch. The shields are arranged along the sides of the path of the shovel and hang against it, forming a casing which prevents the earth from falling off the shovel. A connecting-rod 62 is pivoted to a cross-shaft 63 near the central portion of the bit 32 and extends forward and is secured to a rock-shaft 64, which is mounted in bearings on the main frame, and one end of the rock-shaft is provided with a depending crank 65, which carries a pawl 66. The pawl is held by a spring 67 to engage the notches on a ratchet-wheel 681, which is secured to one side of a drum 68, the ratchet-wheel being held from turning backward by a pawl 69, pivoted on a support of the main frame and engaging the teeth of the wheel. It will thus be seen that every time the bit 32 is moved it will rock the shaft 64 and crank 65, and that a step-by-step movement will be imparted to the drum 68.

The drum 68 has a cable 70 wound thereon, and the cable extends downward from the drum, as shown in Figs. 1 and 2, and forward through keepers 71 on the inner side of one of the shoes 12, over pulleys 72 in opposite ends of the evener 73, and is finally secured in a staple 74 on the inner side of the opposite shoe 12. The evener 73 is provided with links 75 on the front side, and to these a cable 76 is secured, the cable being passed around a post 77, which is driven securely into the ground in advance of the machine, and it will be seen that as the cable is shortened or wound upon the drum the machine will be drawn forward toward the post.

Pivoted to the rear portion of the machine is a depending spout 78, which is curved rearwardly and is long enough to enter the ditch dug by the machine. The tiles 79, which are laid in the ditch, may be adjusted and dropped down through the spout and will be laid by it in the bottom of the ditch, as best shown in Fig. 1. A scraper 80 is arranged diagonally behind the machine and a little to one side, the scraper being held in position by means of the braces 81 and 82, which are pivoted to the front and rear ends of the scraper and which are also pivoted to the main frame, and it will be seen that as the machine advances the scraper will scrape the earth which has been thrown out by the machine back into the ditch, so as to cover the tiles.

Near the front and rear ends of the machine-frame are vertical rods 83, which have lower bent ends 84 pivoted directly to the frame. The upper ends of the vertical rods terminate in laterally-extending arms 85, which are arranged on the left side of the machine. When the machine is to be used, the rods 83 are raised and the machine is brought to a desired height by sighting over the bent arms 85 and over suitable marks on stakes which are driven in the rear of the machine, and the frame of the machine is raised or lowered in the manner described until the arms are in line with the marks on the stakes. The ordinary survey-stakes are used to lay out the course of the machine, and its operation will be clearly understood from the description of the parts heretofore given.

Having thus fully described my invention, I claim as new and desire to secure by Letters Patent—

1. A ditching-machine comprising a portable frame, a vertically-movable bit and shovel mounted in the frame, a scraper arranged to push the earth from the shovel, and means for operating the scraper, substantially as described.

2. A ditching-machine comprising a portable frame, a vertically-movable bit and shovel mounted in the frame, a transversely-moving scraper to push the earth from the shovel, and earth-shields pivoted on the sides of the frame, substantially as described.

3. A ditching-machine comprising a vertically-adjustable frame, a bit and shovel mounted in the frame, means for raising and lowering the bit and shovel, and a transversely-moving scraper to push the earth from the shovel, substantially as described.

4. The combination, with a main frame, carrying a ditching-machine, as described, of vertical posts mounted to slide in the main frame, the lower ends of the posts resting upon shoes, and a gear mechanism for adjusting the frame upon the posts, substantially as described.

5. A ditching-machine comprising a portable frame, a gear-wheel mounted in the frame and carrying a shovel, a shovel-beam pivoted to the shovel-handle and to the main frame, a vertically-movable bit carried by the shovel-beam, and means for turning the gear-wheel, substantially as described.

6. A ditching-machine comprising a portable frame, a gear-wheel pivoted in the frame, a concave shovel having its handle pivoted to the gear-wheel, a shovel-beam pivoted to the shovel-handle and to the main frame, a vertically-movable bit carried by the shovel-beam, a spring-actuated scraper to push the earth from the shovel, a lever mechanism for operating the scraper, and means for turning the gear-wheel, substantially as described.

7. In a ditching-machine, the combination, with a vertically-movable shovel and shovel-beam, of a spring-actuated scraper shaped to fit the shovel, and an elbow-lever pivoted above the shovel-scraper, one arm of the lever being connected with the scraper and the opposite arm extending into the path of the shovel-beam, substantially as described.

8. In a ditching-machine, the combination, with a vertically-movable shovel and shovel-beam, of a spring-actuated scraper arranged transversely to the shovel, an elbow-lever having one arm connected with the shovel-scraper and the other arm extending into the path of the shovel-beam, and guides for the scraper, substantially as shown and described.

9. In a ditching-machine, the combination, with a vertically-movable shovel and shovel-beam, of slide-blocks held to move vertically in a slideway, said blocks being connected with a shovel-beam, and a vertically-movable bit carried by the blocks, substantially as described.

10. In a ditching-machine, the combination, with a vertically-movable shovel and shovel-beam, of a slideway arranged on the main frame, slide-blocks held to move vertically therein, said blocks being connected by a shaft, a link connecting the shaft with the shovel-beam, and a bit suspended from the shaft, substantially as described.

11. In a ditching-machine, a bit comprising depending side members, side pieces secured to the members, cross-knives connecting the side pieces, and cutters projecting in front of the side pieces, substantially as described.

12. In a ditching-machine, the combination, with a vertically-movable bit, of a drum mounted on the main frame and provided with ratchet-teeth on one edge, a cable extending from the drum to a point in advance of the machine, and mechanism for turning the drum by the movement of the bit, substantially as described.

13. In a ditching-machine, the combination, with a vertically-movable bit, of a drum mounted on the machine and provided with ratchet-teeth on one side, a rock-shaft mounted on the machine-frame, a crank secured to the shaft and carrying a spring-pressed pawl to engage the ratchet-teeth of the drum, and a connecting-rod secured to the rock-shaft and pivoted to the bit, substantially as described.

14. In a machine of the character described, the combination of a main frame mounted on shoes, a revoluble drum carried by the frame, an evener secured in advance of the frame and having pulleys in each end, and a cable extending from the drum through keepers on one shoe over the pulleys of the evener and to a staple on the opposite shoe, substantially as described.

15. A ditching-machine comprising a portable frame mounted on shoes, a vertically-movable bit and shovel carried by the main frame, a transversely-moving scraper to push the earth from the shovel, and a scraper arranged diagonally in the rear of the machine and pivotally connected with the main frame, substantially as described.

16. In a ditching-machine, the combination of the main frame, the vertically-movable shovel, and the shields hinged to the frame on each side of the shovel, substantially as described.

OTTIS HUGHES.

Witnesses:
HENRY HEINSUTH,
E. C. WILLIAMS.